(12) United States Patent
Lammers et al.

(10) Patent No.: US 12,424,828 B2
(45) Date of Patent: Sep. 23, 2025

(54) BRANCH BUSBAR DEVICE

(71) Applicant: Eaton Intelligent Power Limited, Dublin (IE)

(72) Inventors: Adri Jan Willem Lammers, Overijssel (NL); Dinant Johan Heilersig, Overijssel (NL)

(73) Assignee: Eaton Intelligent Power Limited, Dublin (IE)

( * ) Notice: Subject to any disclaimer, the term of this patent is extended or adjusted under 35 U.S.C. 154(b) by 220 days.

(21) Appl. No.: 18/457,783

(22) Filed: Aug. 29, 2023

(65) Prior Publication Data
US 2024/0072520 A1   Feb. 29, 2024

(51) Int. Cl.
*H02B 1/20* (2006.01)
*H01R 4/66* (2006.01)
*H02B 13/035* (2006.01)

(52) U.S. Cl.
CPC ............ *H02B 1/202* (2013.01); *H01R 4/66* (2013.01); *H02B 13/0358* (2013.01)

(58) Field of Classification Search
CPC ....... H02B 1/202; H02B 13/0358; H01R 4/66
USPC ........................................................ 174/68.2
See application file for complete search history.

(56) References Cited

U.S. PATENT DOCUMENTS

| 4,072,832 A | 2/1978 | Kuenzle et al. |
| 7,310,221 B2 | 12/2007 | Lammers |
| 2016/0049775 A1 | 2/2016 | Saxegaard et al. |
| 2020/0396830 A1* | 12/2020 | Yasuda ................. H05K 1/189 |

FOREIGN PATENT DOCUMENTS

| CN | 100481661 C | * | 4/2009 |
| DE | 2442405 A1 | | 3/1976 |
| EP | 1504508 B1 | | 5/2010 |
| JP | S51-053226 A | | 5/1976 |
| JP | 2005530465 A | | 10/2005 |
| JP | 2007104840 A | | 4/2007 |
| WO | WO 2006089644 A2 | | 8/2006 |

* cited by examiner

*Primary Examiner* — Andargie M Aychillhum
(74) *Attorney, Agent, or Firm* — LEYDIG, VOIT & MAYER, LTD.

(57) ABSTRACT

A Branch busbar device for high voltage arrangements, whereby the branch busbar device comprises a first electric line with a first electric contact area and a second electric line with a second electric contact area, whereby the first electric contact area is connected to the second electric contact area, whereby a first field limiting part is arranged at a first place adjacent to the contact areas, a second field limiting part is arranged at a second place adjacent to the contact areas, and the first field limiting part and the second field limiting part are electrically connected to the first electric line or to the second electric line or to a third electric line of the branch busbar device is provided.

7 Claims, 3 Drawing Sheets

BRANCH BUSBAR DEVICE

CROSS-REFERENCE TO RELATED APPLICATIONS

This application claims priority pursuant to 35 U.S.C. 119(a) to British Application No. 2212628.8, filed Aug. 31, 2022, which application is incorporated herein by reference in its entirety.

FIELD

The present disclosure relates to a branch busbar device according to the generic part of claim 1.

BACKGROUND

Branch busbar devices are well known and they are typically housed inside switchgears, panel boards and busbar enclosures for local high current power distribution. Such devices are typical used in three phase electric systems with middle or high voltages. They are also used to connect high or medium voltage equipment at electrical switchyards. Typically, the voltages are higher than 1 kV, especially higher than 10 kV.

Branch busbar devices generally comprise uninsulated electric lines inside a housing. The combination of the typical voltages and the use of non-insulated parts causes problems with electrostatic fields and electromagnetic fields. It is principally not possible to completely avoid such electrostatic and electromagnetic fields. These fields can build up a connection to different electric lines. For example, such a connection could cause an electric arc and therefore different problems in a device.

It is an object of the present invention to overcome the drawbacks of the state of the art by providing a branch busbar device which has a higher safety concerning electrostatic and/or electromagnetic fields.

According to the invention, the aforementioned object is solved by the features of claim 1.

As a result, a branch busbar device with less problems concerning electrostatic and/or electromagnetic fields is achieved. Electrostatic fields are limited. The expansion space of such fields is limited and the fields are directed to the field limiting parts. The field limiting parts prevent that different phase lines connect to each other. The field would only exist in the space between the electric lines and the field limiting parts. The field limiting parts further prevent that fields from outside have an influence on the electric lines of the branch busbar device. They create an essentially almost field neutral area between the first field limiting part and the second field limiting part. The branch busbar device has a high electric safety, a long lifetime, a low susceptibility of errors and a low space requirement.

The dependent claims describe further preferred embodiments of the invention.

BRIEF DESCRIPTION

The invention is described with reference to the drawings. The drawings show only exemplary embodiments of the invention.

DETAILED DESCRIPTION

Figures 1, 2:
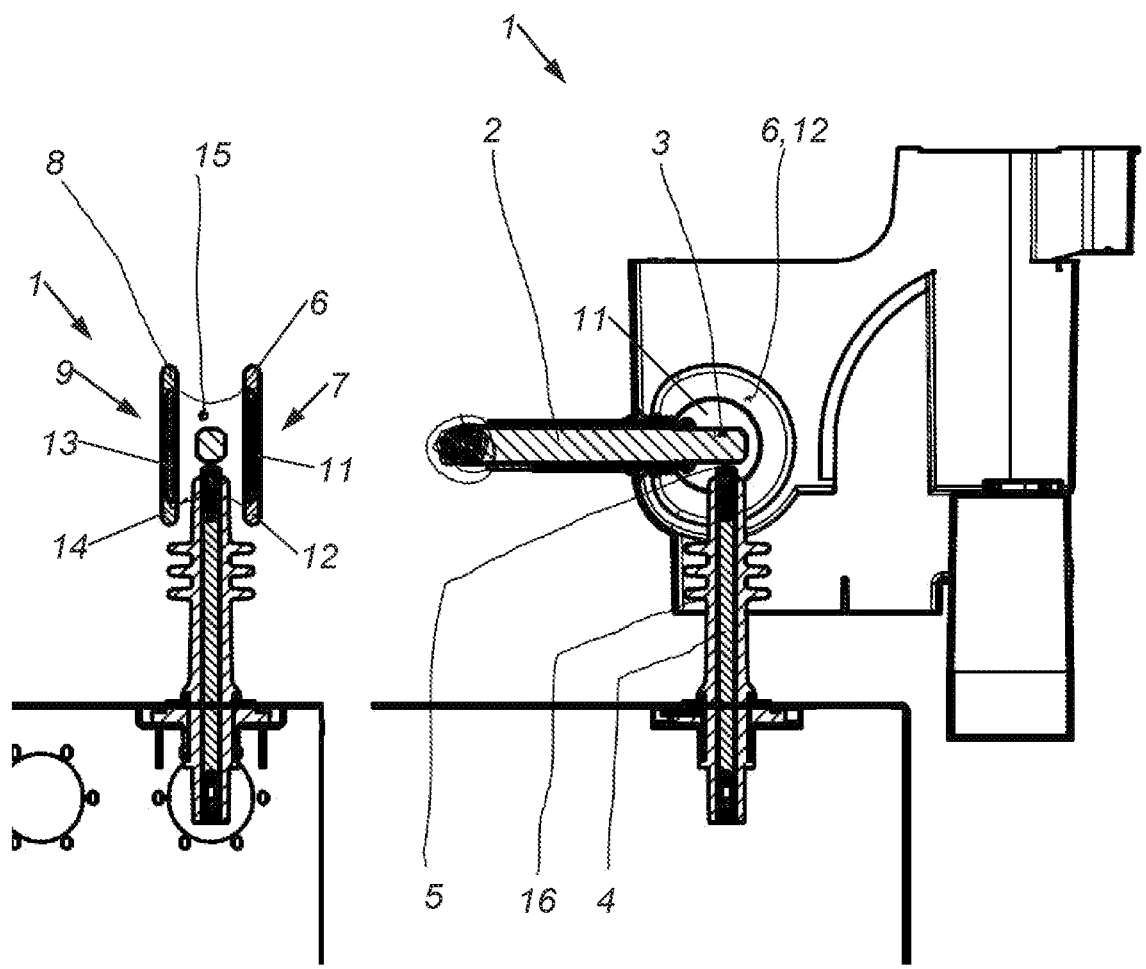
FIG. 1 illustrates an inner part of a branch busbar device in a first view.
FIG. 2 illustrates the branch busbar device according to FIG. 1 in a second view.

FIGS. 1 to 4 illustrate a preferred embodiment of a branch busbar device 1 for high-voltage and/or medium-voltage arrangements, whereby the branch busbar device 1 comprises a first electric line 2 with a first electric contact area 3 and a second electric line 4 with a second electric contact area 5, whereby the first electric contact area 3 is connected to the second electric contact area 5, whereby a first field limiting part 6 is arranged at a first place 7 adjacent to the contact areas 3, 5, whereby a second field limiting part 8 is arranged at a second place 9 adjacent to the contact areas 3, 5, and whereby the first field limiting part 6 and the second field limiting part 8 are electrically connected to the first electric line 2 or to the second electric line 4 or to a third electric line 10 of the branch busbar device 1.

As a result, a branch busbar device 1 with less problems concerning electrostatic and/or electromagnetic fields 15 is achieved. Electrostatic fields 15 are limited. The expansion space of such fields 15 is limited and the fields 15 are directed to the field limiting parts 6, 8. The field limiting parts 6, 8 prevent that different phase lines connect to each other. The field 15 would only exist in the space between the electric lines 2, 4, 10 and the field limiting parts 6, 8. The field limiting parts 6, 8 further prevent that fields from outside have an influence on the electric lines 2, 4, 10 of the branch busbar device 1. They create an essentially almost filed neutral area between the first field limiting part 6 and the second field limiting part 8. The branch busbar device 1 has a high electric safety, a long lifetime, a low susceptibility of errors and a low space requirement.

Branch busbar devices are known and used in a lot of cases. Those cases comprise connections between electric lines. These lines do not have any insulation at least at the parts where they are connected to each other. Often these electric lines are completely uninsulated in the whole branch busbar device.

The branch busbar device 1 is particularly used for medium or high voltage arrangements, with voltages higher than 1 kV (1000 V).

According to a preferred embodiment, the actual branch busbar device 1 could be part of a circuit breaker.

Figure 3:
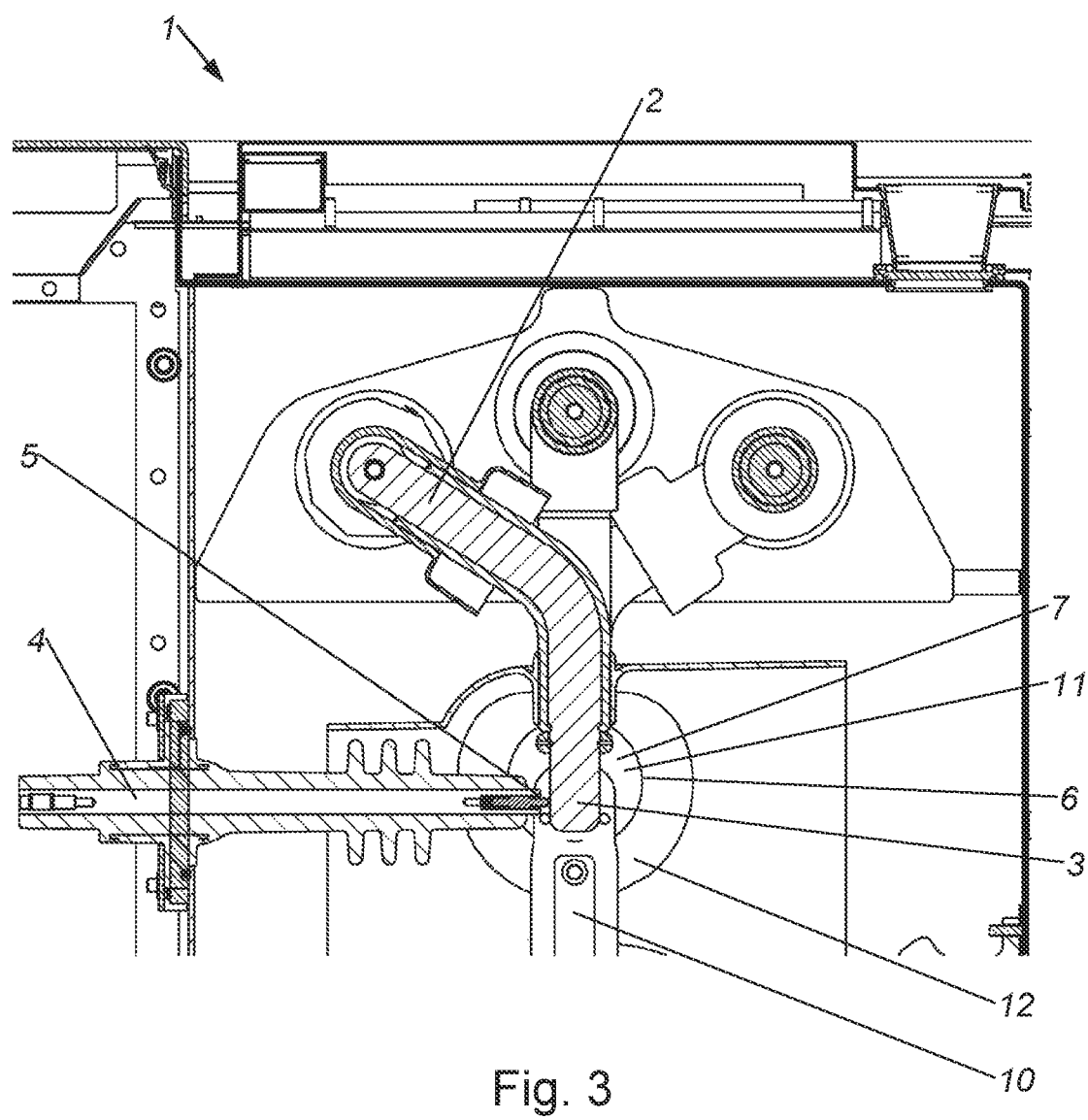
FIG. 3 illustrates a bigger part of the branch busbar device according to FIG. 1.
Figure 4:
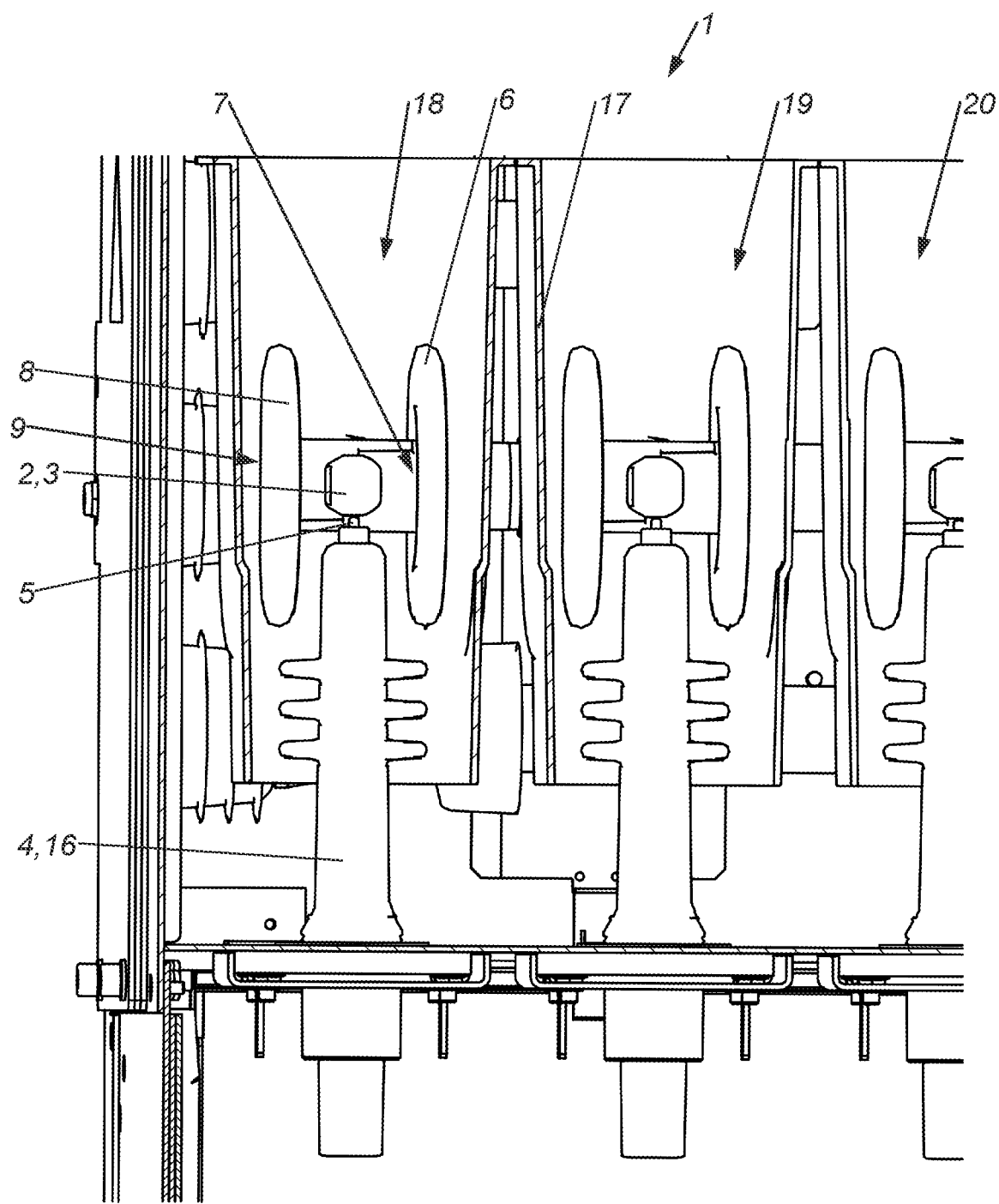
FIG. 4 illustrates details of the branch busbar device according to FIG. 1 in a three-dimensional view.

The branch busbar device 1 preferably comprises three electric phases 18, 19, 20, as shown in FIGS. 3 and 4. FIGS. 1 and 2 only show one of these phases. It is possible that the number of phases 18, 19, 20 is higher or lower than three. Actually, only one of these phases 18, 19, 20 is described in detail. It is preferred, that all phases 18, 19, 20 are embodied as the described electric phase, and as probably shown in FIG. 4. FIG. 4 shows the parts for the first phase 18 and the second phase 19, and beginning parts of the third phase 20. As also shown in FIG. 4 limiting walls 17 are arranged between the parts according the each of the phases 18, 19, 20.

Each electric phase comprises a first electric line 2 and a second electric line 4. Preferably the first and the second electric lines 2, 4 comprise electrical insulation parts on most of their length. FIGS. 1 to 4 each show such insulating parts. Especially the second line 4 comprises an insulation 16 with a large outer surface.

The first electric line 2 comprise a first electric contact area 3. Actually, this first electric contact area 3 is arranged at an end of the first electric line 2. The second electric line 4 comprises a second electric contact area 5. Actually, this second electric contact area 5 is arranged at an end of the second electric line 4. It is possible that the first and the second electric contact areas 3, 5 are arranged at different parts of the first and second electric line 2, 4. The first and the second electric contact areas 3, 5 are non-insulated. The first and second electric lines 2, 4 typically comprise copper and/or aluminum.

The first electric contact area 3 is connected to the second electric contact area 5. Preferably the second electric line 4 is arranged in a right angle to the first electric line 2, as exemplarily shown in FIG. 2. Therefore, a front surface of the second electric contact area 5 connects or touches a side surface of the first electric contact area 3. In fact, the first and the second contact area 3, 5 are located on one connecting position. This connecting position can also by designated as a combination of the contact areas 3, 5.

Preferably one of the two electric lines 2, 4 comprises a feature or another device to force the second electric contact area 5 against the first electric contact area 3.

It is provided, that the branch busbar device 1 comprises at least one field limiting parts 6, 8. According the preferred embodiments, the branch busbar device 1 comprises at least two field limiting parts 6, 8. A first field limiting part 6 is arranged at a first place 7 adjacent to the contact areas 3, 5, respectively the connecting position of the first and the second contact area 3, 5. Also a second field limiting part 8 is arranged at a second place 9 adjacent to the contact areas 3, 5, respectively the connecting position of the first and the second contact area 3, 5.

It is preferred, that the first field limiting part 6 and the second field limiting part 8 are embodied essentially identical. This includes the mechanical construction, the dimensions and the materials. It is not necessary to build or form these parts essentially identical, but it enables an easier placement of the field limiting parts 6, 8. The first field limiting part 6 and the second field limiting part 8 are electrically connected to an electric line 2, 4, 10 of the branch busbar device 1. The first field limiting part 6 and the second field limiting part 8 can be electrically connected to the first electric line 2 or to the second electric line 4 or to the third electric line 10 of the branch busbar device 1. A defined and/or almost constant electric potential at the first and the second field limiting part 6, 8 is necessary for the positive effect of this arrangement.

A preferred embodiment will now be described for the first field limiting part 6. All described features are also preferred for the second field limiting part 8.

Preferably, the first field limiting part 6 comprises a first slim plate 11. The first slim plate 11 could also be called first thin plate. Preferably the first slim plate 11 is thinner than 1 mm. Preferably the first slim plate 11 has an almost flat form and/or flat surface. The first slim plate 11 can have different forms. Preferably the first slim plate 11 has a round shape.

The first slim plate 11 has a sufficiently high electrical conductivity. The first slim plate 11 comprises a conductive material. Typically, the first slim plate 11 comprises metal or is made of metal. Most metals comprise the electrical conductivity and further a required mechanical strength to safely maintain their form and position in case of higher field effects. This construction is easy to build and has a positive reaction, particularly a high attraction, to electric fields 15.

Preferably also the second field limiting part 8 comprises a second slim plate 13. The second slim plate 13 could also be called second thin plate. This second slim plate 13 has a sufficiently high electrical conductivity. Preferably the second slim plate 13 has an almost flat form and/or a flat surface. Typically, the second slim plate 13 comprises metal or is made of metal, as further described for the first slim plate 11. This construction is easy to build and has a positive reaction regarding electric fields 15.

Preferably, the first slim plate 11 of the first field limiting part 6 is connected to one of the electric lines 2, 4, 10 of the branch busbar device 1. For this connection it is preferred, that the first slim plate 11 comprises at least one contact element. This would make the electrical connection of the field limiting parts 6, 8 easy and it is possible to change said field limiting parts 6, 8 in a short time. Preferably, also the second slim plate 13 is connected according to these preferred features.

Even when the first slim plate 11 has principally advantages for electric fields 15, it is possible that edges of the first slim plate 11 could cause field effects that are not desired. It is particularly preferred, that border or edge parts of the first slim plate 11 are encased by a first insulating coat 12 or casing. The first insulating coat 12 preferentially comprises plastic and has a mechanical softness. Such an insulating coat 12 prevents or limits fields 15 from one side of the first slim plate 11 to the other side of the first slim plate 11. If the first slim plate 11 has a round shape, the diameter of the first slim plate 11 is higher than the breadth of the first insulating coat 12. If the first slim plate 11 has a not round shape, the length of the first slim plate 11 is higher than the breadth of the first insulating coat 12. Preferably, also the second slim plate 13 has a second insulating coat 14 according to these preferred features. The first insulating coat 12 and the second insulating coat 14 enhance the positive effect of the first and the second field limiting parts 6, 8 in regard to the contact areas 3, 5 of the first and the second electric line 2, 4.

Preferably the first slim plate 11 is thinner than the thickness of the first insulating coat 12. The thickness of the first slim plate 11 is preferably less than 30%, preferably less than 20%, of the thickness of the first insulating coat 12. Preferably the second slim plate 13 is thinner than the thickness of the second insulating coat 14. The thickness of the second slim plate 13 is preferably less than 30%, preferably less than 20%, of the thickness of the second insulating coat 14.

Preferably, the first and the second field limiting parts 6, 8 are arranged in a way to include or at least substantially encase main parts of the contact areas 3, 5 of the first and the second electric line 2, 4. It is particularly preferred that the first field limiting part 6 is arranged parallel to the second field limiting part 8. It can be further preferred, that the first field limiting part 6 is arranged opposite to the second field limiting part 8 and that the contact areas 3, 5 are located between said field limiting parts 6, 8. This is exemplarily illustrated in FIGS. 1 and 4. This arrangement is very easy to build and has positive field effects, as the field 15 has the same distances from each point. FIG. 1 shows the field 15 in a schematic way. Further, it is preferred, that the first field limiting part 6 and the second field limiting part 8 are connected to each other with at least one holding part. Such a holding part helps in saving the position of the first and second slim plate 11, 13 against vibrations or other electrical or mechanical effects. As a result, the first field limiting part 6 and the second field limiting part 8 have relatively the same electric potential. Therefore, there it is no potential difference between the first field limiting part 6 and the second field limiting part 8. Particularly preferred, the first slim plate 11 and/or the second slim plate 13 comprises at least one opening to reduce pressure by gases around, especially by mechanical vibrations of the slim plates 11, 13.

As described before, it is provided, that the first field limiting part 6 and the second field limiting part 8 are electrically connected to one of the electric lines 2, 4, 10 of the branch busbar device 1. Preferably, the first field limiting part 6 and the second field limiting part 8 are electrically connected to the first electric line 2 or to the second electric line 4. This connection would cause a defined electric field, and would be easy to build.

It could also be preferred, that the first field limiting part 6 and the second field limiting part 8 are electrically connected to a third electric line 10 of the branch busbar device 1. In this embodiment it is possible to connect the field limiting parts 6, 8 with an electric potential that could be selected or planned for the main sense and without the setup of the first electric line 2. It is particularly preferred, that the third electric line 10 is free of an electrical contact to the first and the second electric lines 2, 4. Preferably the third electric line 10 is connected with a contact element of the branch busbar device 1 to be connected to a predeterminable electric potential.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

Hereinafter are principles for understanding and interpreting the actual disclosure.

Features are usually introduced with an indefinite article "one, a, an". Unless otherwise stated in the context, therefore, "one, a, an" is not to be understood as a numeral.

The conjunction "or" has to be interpreted as inclusive and not as exclusive, unless the context dictates otherwise. "A or B" also includes "A and B", where "A" and "B" represent random features.

By means of an ordering number word, for example "first", "second" or "third", in particular a feature X or an object Y is distinguished in several embodiments, unless otherwise defined by the disclosure of the invention. In particular, a feature X or object Y with an ordering number word in a claim does not mean that an embodiment of the invention covered by this claim must have a further feature X or another object Y.

An "essentially" in conjunction with a numerical value includes a tolerance of ±10% around the given numerical value, unless the context dictates otherwise.

For ranges of values, the endpoints are included, unless the context dictates otherwise.

What is claimed is:

1. A branch busbar device for high-voltage and/or medium-voltage arrangements, whereby the branch busbar device comprises a first electric line with a first electric contact area and a second electric line with a second electric contact area, whereby the first electric contact area is connected to the second electric contact area, whereby a first field limiting part is arranged at a first place adjacent to the contact areas, whereby a second field limiting part is arranged at a second place adjacent to the contact areas, and whereby the first field limiting part and the second field limiting part are electrically connected to the first electric line or to the second electric line or to a third electric line of the branch busbar device, wherein the first field limiting part comprises a first slim plate, that the first slim plate comprises a conductive material, and that the first slim plate is connected to one of the electric lines, wherein border parts of the first slim plate are encased by a first insulating coat, wherein the second field limiting part comprises a second slim plate, the second slim plate comprises a second conductive material, and the second slim plate is connected to one of the electric lines, wherein border parts of the second slim plate are encased by a second insulating coat, and wherein the first insulating coat and the second insulating coat enhance the positive effect of the first field limiting part and the second field limiting part for the first electric contact area of the first electric line and the second electric contact area of the second electric line.

2. The branch busbar device according to claim 1, wherein the first slim plate comprises at least one opening.

3. The branch busbar device according to claim 1, wherein the first field limiting part and the second field limiting part are embodied essentially identical.

4. The branch busbar device according to claim 1, wherein the first field limiting part is arranged parallel to the second field limiting part.

5. The branch busbar device according to claim 1, wherein the first field limiting part and the second field limiting part have the same electric potential.

6. The branch busbar device according to claim 5, wherein the first field limiting part and the second field limiting part are connected to each other with at least one holding part.

7. A circuit breaker comprising the branch busbar device according to claim 1.

* * * * *